United States Patent Office 3,414,480
Patented Dec. 3, 1968

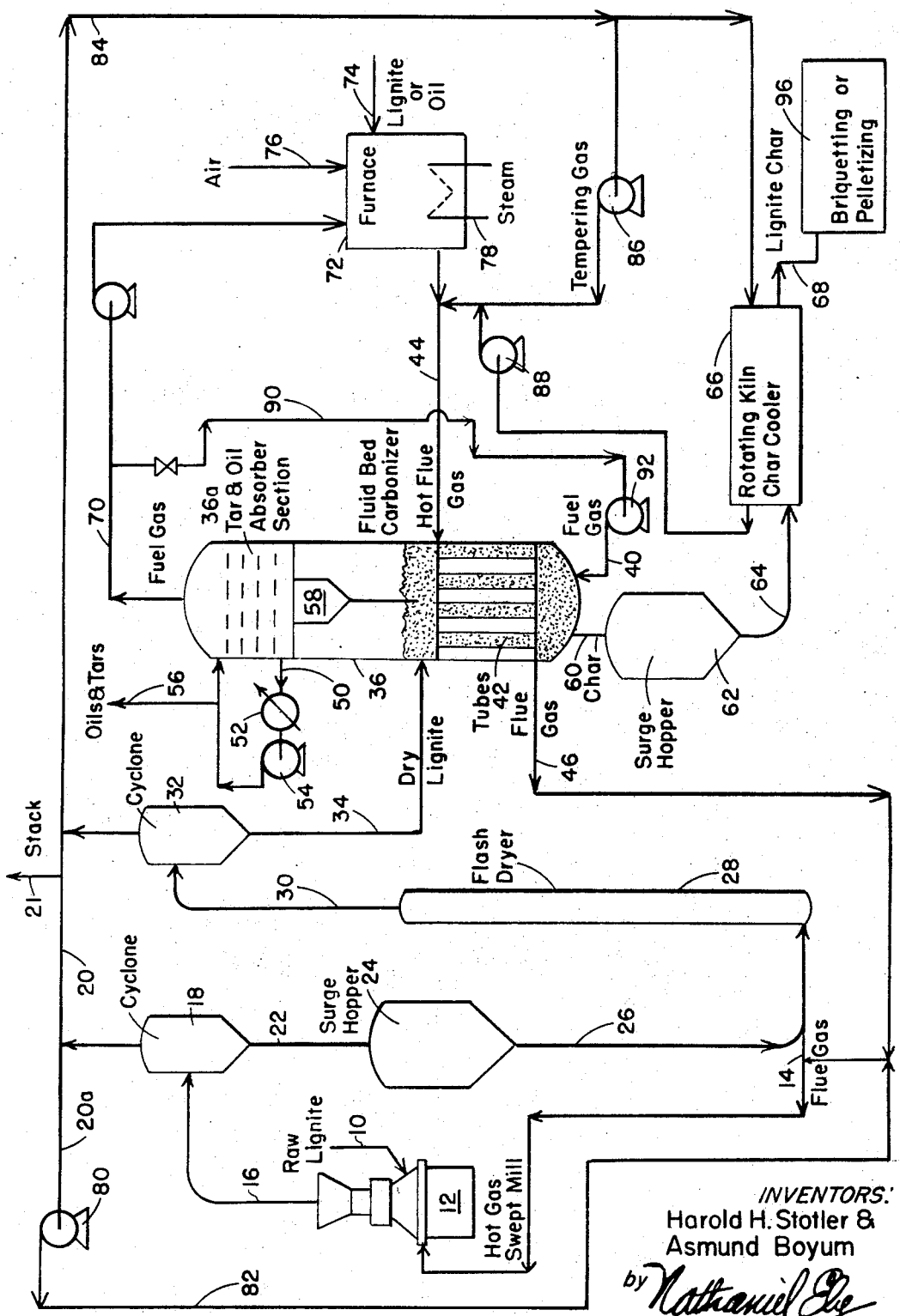

3,414,480
FRACTIONAL VAPOR PRODUCT ABSORPTION OF FLUIDIZED LIGNITE CARBONIZATION
Harold H. Stotler, Westfield, N.J., and Asmund Boyum, Brooklyn, N.Y., assignors to Hydrocarbon Research, Inc., New York, N.Y., a corporation of New Jersey
Filed Oct. 1, 1965, Ser. No. 492,222
5 Claims. (Cl. 201—15)

This invention relates to an economic process for the carbonization of low fuel value carbonaceous materials containing volatile constituents to produce a carbonized product of high fuel value. A typical low fuel value material which can be used in this process is lignite.

It is well known that there are vast quantities of lignite available in certain limited regions of the United States. However, the use of this lignite is limited to the immediate regions where it is found because of the high cost for shipping such a low fuel value material.

In accordance with our invention, the lignite can be economically converted to a high fuel value material by carbonization, thereby producing a product which is economic to ship to areas where high fuel value carbonaceous fuels are needed. For example, lignite mined in North Dakota can be economically converted to a high fuel value product and shipped to the taconite iron ore regions of Minnesota where it can be used as a fuel and a reducing agent in the operations which concentrate the iron ore. The product can also be used as a fuel for steel making.

The economic conversion of lignite to a high fuel value product depends upon achieving a high fuel efficiency at a minimum of capital cost. Our invention has features to achieve this goal which will be evident from the following description of the process.

The drawing is a diagrammatic layout of a lignite carbonization process showing the principal steps.

Raw lignite is charged by line 10 to a conventional hot gas swept grinding mill 12 where the lignite is surface dried (to about 15 wt. percent moisture) and ground to a suitable particle size for fluidization. Hot flue gases from line 14 pass through the mill to provide the surface drying and to classify the lignite particles. The flue gases and ground lignite leave the mill by line 16 and the gases and solids are separated in cyclone 18. The ground lignite discharges from cyclone 18 through line 22 to surge hopper 24.

The lignite then discharges by line 26 into a stream of hot flue gases from line 46 and is flash dried as the entrained lignite passes through drier 28 leaving at a temperature of about 200° F. The gases and lignite from drier 28 pass by line 30 to cyclone 32 where they are separated. The dried lignite continuously passes from cyclone 32 by line 34 to the carbonizer zone in the fluid bed carbonizer 36.

The lignite is carbonized in a dense phase fluidized bed in the carbonization zone at a temperature of about 700°–1100° F. Heat for the carbonization is supplied to the fluidized bed indirectly. Hot flue gas from line 44 passes through a series of vertical heat transfer tubes 42 releasing sensible heat indirectly to the fluidized bed. A gas velocity of about 2 ft./sec. is maintained in the fluidized bed by introducing a small portion of the non-condensible gases and vapors from line 70 to the bottom of the bed by lines 90 and 40. The gas velocity in the heat transfer tubes is maintained at 150 to 250 ft./sec. It is obvious that the system as described here requires a much smaller diameter carbonizer than if lignite was burned directly with air in the fluid bed to supply all the heat required since the flue gas used to supply the heat requirement passes through the heat transfer tubes at a much higher velocity than would be permissible through the fluid bed.

The heat transfer tubes also serve another important function. It has been found that in large diameter fluidized beds a much more uniform fluidity of the bed can be achieved by having vertical tubes spaced uniformly throughout the cross section of the bed. These tubes prevent large bubbles of fluidizing gas from forming in one section of the bed's cross section while other areas of the cross section have essentially no gas passing through and are therefore dead spots in the vessel. Therefore, the vertical heat transfer tubes in the fluidized bed control the gas bubbles to a size smaller than the spacing between the tubes and also help keep the fluidizing gas uniformly distributed through the cross section of the bed. Patent No. 2,995,426 describes the use of vertical tubes for this purpose in more detail. Here sufficient tubes to provide a surface of 6 to 12 square in each cubic foot of fluidized bed are recommended. We have found that heat transfer tubes of adequate size and spacing to provide this tube surface to bed volume will be adequate for transferring the heat required for carbonization in the carbonizer 36.

The heat transfer tubes required in the fluidized bed are of inexpensive construction. The wall temperature of the tubes will be close to that of the fluidized bed rather than the flue gases which are several hundred degrees hotter since the heat transfer coefficient in the fluidized bed is of the order of 10 times higher than that inside the tube.

The carbonized lignite (char) passes from carbonizer 36 to surge hopper 62 by line 60.

The volatilizable constituents leave the fluidized bed with some entrained solids and pass through an internal cyclone 58 in a gas-solid separating zone to remove and return the entrained solids to the fluidized bed. The volatilizable constituents then pass through an absorber zone 36a where the tar and oil are absorbed. The tar and oil leave by line 50, are cooled in exchanger 52 and then pass through pump 54. The oil and tar product are withdrawn from the system by line 56 and a recycle absorbent stream of the oil and tar pass to the top of the absorber zone to absorb at a temperature of about 200° F. the tar and oil from the gas and vapor stream leaving cyclone 58.

Since indirect heat transfer is used in the carbonization zone the non-condensible gases passing through absorber zone 36a are kept to a minimum. They consist only of the gases produced from the lignite during the carbonization step and the small quantity of gas introduced at the bottom of the fluidized bed to establish fluidization. This greatly simplifies the recovery of the tar and oil in absorber zone 36a. The concentration of oil and tar in the gases entering the absorber zone 36a is sufficiently high to enable a high percentage recovery of oil and tar at a temperature at which moisture will not condense. This eliminates the emulsion problems which are normally encountered when oil and gas condense together. The absorber also operates at a high enough temperature such that the condensed oil and tar will have a low enough viscosity that the mixture can be used satisfactorily as an absorbent.

A portion of the non-condensible gases leaving the absorption zone 36a by line 70 is recycled by line 90, compressor 92, and line 40 to the bottom of the carbonization zone to provide fluidizing gas. The remainder is used as fuel in furnace 72 to supply part of the flue gas sent to the heat exchange tubes in the carbonizer. The remainder of the flue gas supplied to line 44 is produced by the combustion of raw lignite 74 or recovered oil in furnace 72 using air at 76.

A portion of the flue gases leaving the drying system by line 84 passes through rotary kiln 66 where the carbonized product from hopper 62 by line 64 is cooled. The preheated flue gases from rotary kiln 66 after being compressed at 88 are used to temper the combustion gas produced in furnace 72. The cooled carbonized product passes by line 68 to a pelletizing or briquetting step 96 where recovered tar is used as a binder to make a shippable product.

In the process as described, it is expected that the flue gas leaving the system by line 21 will be at a temperature of 200° F. and the carbonized product will leave the system by line 68 at about 250° F. It is, therefore, evident that the fuel efficiency for the overall system is quite high. It is estimated that the overall fuel efficiency of the process is over 90%.

Example 850 tons per day of raw lignite having a fuel value of 7,240 B.t.u./lb. will produce 400 tons per day of char having a heating value of 12,000 B.t.u./lb. and 28.8 tons per day of oil and tar. The total fuel requirement for the process is estimated at 2,240 B.t.u./ton of total products made. The total char, oil and tar produced is equivalent to 27.6 mm. B.t.u./ton of total products. This results in a fuel efficiency of 92.5%.

Obviously, many modifications and variations of the invention as above set forth may be made without departing from the spirit and scope thereof and only such limitations should be imposed as are indicated in the appended claims.

We claim:
1. A process for the carbonization of lignite containing volatile constituents which comprises:
   (a) maintaining a dense phase fluidized bed of particles of lignite in a carbonization zone to distill from said particles volatilizable constituents thereby producing a carbonized material, wherein the heat required for carbonization is supplied by hot flue gas passing through a series of vertical heat exchange tubes located within the fluidized bed;
   (b) separating a substantial portion of the entrained solids from the volatizable constituents leaving the carbonization zone in a solid-gas separating zone and returning separated solids to the carbonization zone;
   (c) recovering condensible oil and tar from the hot volatile constituents leaving the solids-gas separating zone by rapid cooling of these constituents in an absorption zone, and wherein a portion of the non-condensible gases leaving said zone are recycled to the bottom of the carbonization zone to provide fluidizing gas, and wherein the remainder of non-condensible gases are used as fuel to supply at least a portion of the hot flue gases passed through the heat exchange tubes in the carbonization zone.

2. A process as defined in claim 1 wherein a portion of the heat for carbonization is supplied by introducing a small portion of air into the bottom of the carbonization zone to react with a small portion of the carbonaceous material and volatile constituents.

3. A process as defined in claim 1 wherein the flue gases leaving the heat exchanger tubes in the carbonization zone are used to dry the carbonaceous material before introducing the carbonaceous material into the carbonization zone.

4. A process as defined in claim 1 wherein tar removed from the carbonaceous material is used as a binder to form a shippable carbonized product from the particles of solid carbonized material produced in the carbonization zone.

5. A carbonizer for carbonizing lignite comprising:
   (a) a substantially cylindrical vessel having a lower heat exchange section, an intermediate gas-solids separating section, and an upper tar and oil absorber section;
   (b) said heat exchange section consisting of a bank of tubes extending between top and bottom tube sheets which form with the wall of the vessel, an indirect gas heating chamber;
   ($b_2$) means for withdrawing the noncondensed gases from the overhead of the vessel, dividing the gases into plural streams and directing at least one portion to the lower portion of the vessel for fluidizing the lignite and a second portion to a combustion furnace providing hot combustion gases;
   (c) means to introduce hot combustion gases to and to remove cooler gas from said tubes;
   (d) means to introduce raw lignite to the lower part of the vessel around the tubes, and;
   (e) means to pass a fluidizing gas upwardly through the raw lignite to maintain the lignite in fluidized conditions around said tubes and in heat exchange with the gas of step (c).

References Cited

UNITED STATES PATENTS

| | | | |
|---|---|---|---|
| 2,738,315 | 3/1956 | Martin et al. | 201—31 XR |
| 2,814,587 | 11/1957 | Van Dijck | 201—29 XR |
| 2,873,247 | 2/1959 | Borey | 202—121 XR |
| 3,318,798 | 5/1967 | Kondis et al. | 201—29 XR |

NORMAN YUDKOFF, *Primary Examiner.*

D. EDWARDS, *Assistant Examiner.*